UNITED STATES PATENT OFFICE.

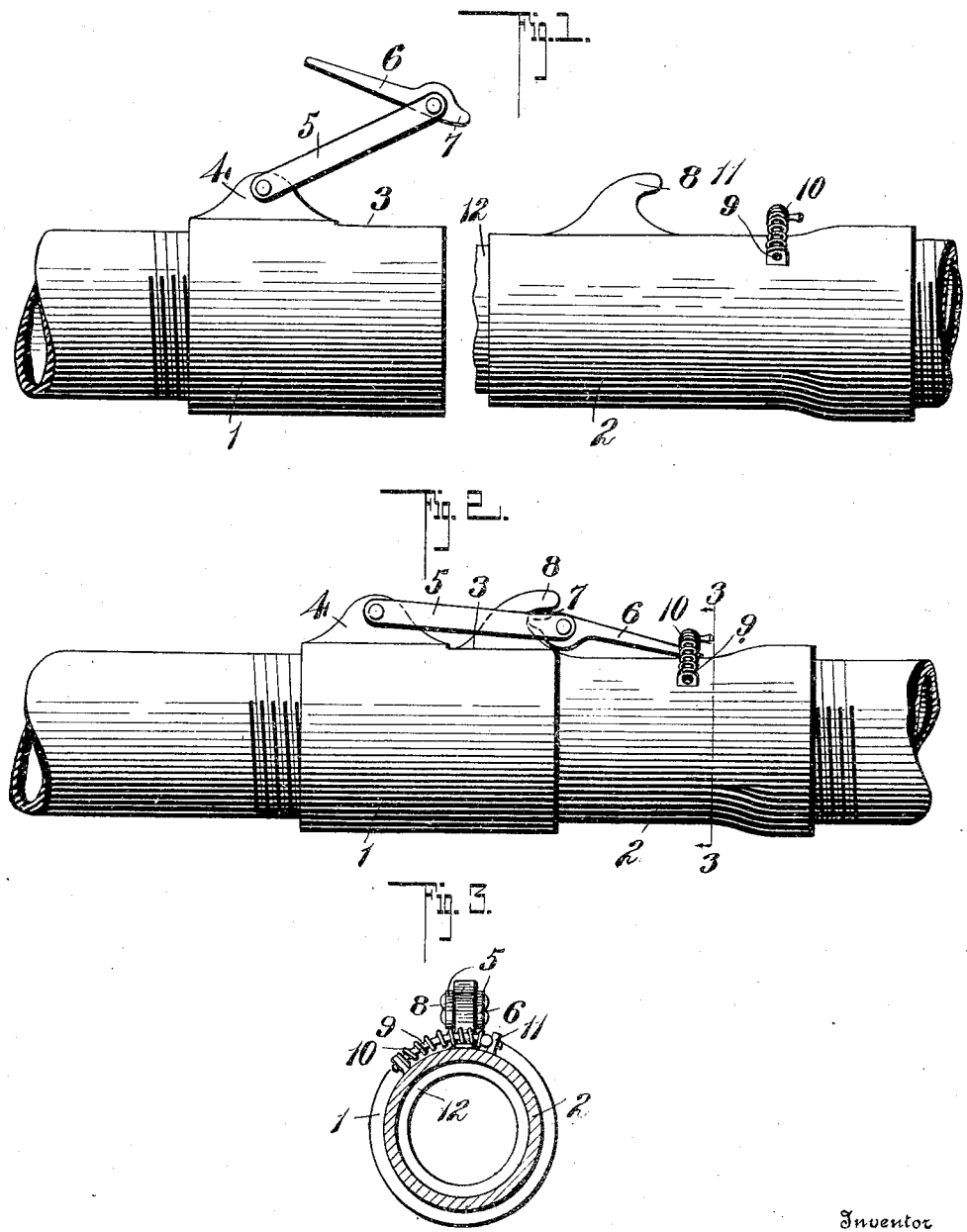

TAYLOR EVANS, OF CENTRALIA, WASHINGTON.

HOSE-COUPLING.

965,998.  Specification of Letters Patent.  Patented Aug. 2, 1910.

Application filed October 23, 1908. Serial No. 459,254.

*To all whom it may concern:*

Be it known that I, TAYLOR EVANS, a citizen of the United States, residing at Centralia, in the county of Lewis and State of Washington, have invented a new and useful Improvement in Hose-Couplers, of which the following is a specification.

This invention relates to a hose coupler and the object of the invention is a coupling device which can be coupled very quickly, and which is especially adapted for use in connection with fire department hose, and other hose which is subject to being pulled along the ground or otherwise roughly handled while in use.

A further object of the invention is a neat coupling thereby improving the appearance of the hose to which it is attached.

The invention consists in the novel features of construction hereinafter described, pointed out in the claim and shown in the accompanying drawings, in which:—

Figure 1 is a side elevation showing the coupling members detached. Fig. 2 is a side elevation showing said members locked together. Fig. 3 is a section on the line 3—3 of Fig. 2, the parts being in locked position.

In these drawings 1 and 2 represent coupling members which are interiorly threaded or corrugated for engagement with a sectional hose. The coupling member 1 is provided with a longitudinal slot 3 extending from the free end of said coupling member to the base of a projection 4.

Pivotally connected to and upon opposite sides of said projection are parallel arms 5 between the free ends of which is pivoted a locking member 6 provided adjacent its pivotal point with a nose 7.

The coupling member 2 telescopes within the member 1 and is provided with a hooked lug 8 which lug slides in the slot 3 of the member 1 when the members 1 and 2 are fitted together. To lock the coupling members together the arms 5 are swung down over the lug 8, one arm resting upon each side of said lug and the locking lever 6 has its handle portion brought into engagement with the coupling member 2, the nose of said lever engaging the hooked lug 8. To hold the lever in this position I provide a curved spring pressed pin 9 arranged to slide circumferentially with respect to the coupling member 2 and normally held by its spring 10 in engagement with a perforated keeper 11. The end portion of the lever 6 opposite the nose 7 rests under the pin 9 and in order to lift the lever and disengage the nose 7 from the lug 8 it is necessary to press back the locking pin 9.

It will be noted from the above description that hose sections provided with these couplers can be locked together without threading one coupler into the other and can be immediately disengaged by simply pressing back the pin 9 and lifting the lever 6. This provides a very efficient coupler for use in emergencies where a few seconds of time saved may be of the greatest importance.

An inner gasket 12 of rubber or other suitable material is also provided for the purpose of overlapping the joint between the two coupling members and making the joint perfectly water tight.

What I claim is:—

A device of the kind described comprising two coöperating coupler members, a locking lever carried by one member, a lug carried by the other member adapted to be engaged by the locking lever when the members are fitted together, a curved pin arranged circumferentially on the coupling member having a lug, a keeper coöperating with said pin, and a spring for normally holding the pin in engagement with the keeper, the free end of the locking lever resting beneath said pin when the lever is in engagement with the lug.

TAYLOR EVANS.

Witnesses:
 D. B. REES,
 WILLIAM E. KAGLE.